United States Patent
Lee et al.

(10) Patent No.: US 9,269,285 B2
(45) Date of Patent: Feb. 23, 2016

(54) ARRAY SUBSTRATE INCLUDING A FIRST SWITCHING CIRCUIT, A SECOND SWITCHING CIRCUIT, AND A FAN-OUT UNIT, DISPLAY DEVICE INCLUDING THE SAME AND METHOD OF OPERATING THE DISPLAY DEVICE

(75) Inventors: Jae-Sic Lee, Yongin (KR); Dong-Wook Kim, Yongin (KR); Chul-Ho Kim, Yongin (KR); Dong-Hoon Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 886 days.

(21) Appl. No.: 13/209,092

(22) Filed: Aug. 12, 2011

(65) Prior Publication Data
US 2012/0162165 A1    Jun. 28, 2012

(30) Foreign Application Priority Data
Dec. 24, 2010   (KR) .......................... 10-2010-0134185

(51) Int. Cl.
| | | |
|---|---|---|
| G09G 3/36 | (2006.01) | |
| G09G 5/00 | (2006.01) | |
| G09G 3/00 | (2006.01) | |
| G02F 1/1362 | (2006.01) | |

(52) U.S. Cl.
CPC .... G09G 3/006 (2013.01); *G02F 2001/136254* (2013.01); *G09G 3/3614* (2013.01); *G09G 3/3648* (2013.01); *G09G 3/3655* (2013.01); *G09G 2300/0426* (2013.01); *G09G 2310/0248* (2013.01); *G09G 2310/0297* (2013.01); *G09G 2330/023* (2013.01); *G09G 2330/12* (2013.01)

(58) Field of Classification Search
CPC ....................................................... G09G 3/006
See application file for complete search history.

(56) References Cited

U.S. PATENT DOCUMENTS

| | | | | |
|---|---|---|---|---|
| 2006/0028417 | A1* | 2/2006 | Harada et al. | 345/93 |
| 2007/0046581 | A1* | 3/2007 | Kwak et al. | 345/68 |
| 2007/0284578 | A1* | 12/2007 | Yoon | 257/48 |
| 2009/0045727 | A1* | 2/2009 | Kwak | H01L 27/3276 313/504 |
| 2009/0236993 | A1* | 9/2009 | Ishii | 315/129 |
| 2009/0267873 | A1* | 10/2009 | Ishii et al. | 345/76 |

FOREIGN PATENT DOCUMENTS

| | | |
|---|---|---|
| JP | 2006-196584 | 7/2006 |
| KR | 10-2006-0133836 | * 12/2006 |
| KR | 10-2008-0042446 | 5/2008 |

* cited by examiner

*Primary Examiner* — Joseph Feild
*Assistant Examiner* — Karin Kiyabu
(74) *Attorney, Agent, or Firm* — Christie, Parker & Hale, LLP

(57) ABSTRACT

An array substrate includes a display area including a plurality of pixels coupled to a plurality of gate lines and a plurality of data lines; a data driving unit, coupled to a fan-out unit and configured to drive the data lines; a first switching circuit between the display area and the data driving unit and configured to control the data lines to share electric charges in an image display mode; and a second switching circuit coupled to the fan-out unit via a fuse unit and configured to be disconnected from the fan-out unit in the image display mode.

12 Claims, 10 Drawing Sheets

ARRAY SUBSTRATE INCLUDING A FIRST SWITCHING CIRCUIT, A SECOND SWITCHING CIRCUIT, AND A FAN-OUT UNIT, DISPLAY DEVICE INCLUDING THE SAME AND METHOD OF OPERATING THE DISPLAY DEVICE

CROSS REFERENCE TO RELATED APPLICATION

This application claims priority to and the benefit of Korean patent Application No. 10-2010-0134185, filed on Dec. 24, 2010, in the Korean Intellectual Property Office, the entire content of which is hereby incorporated by reference.

BACKGROUND

1. Field

Example embodiments of the present invention relate to a display device.

2. Description of Related Art

Generally, liquid crystal display (LCD) devices may include a display panel having a plurality of pixels, each pixel including a liquid crystal layer having a dielectric anisotropy material between a pixel electrode and a common electrode, and a driving unit that drives the display panel. The LCD device may display an image by controlling light transmittance of the liquid crystal layer based on an intensity of an electric field formed between the pixel electrode and the common electrode.

Among various types of display devices, some devices such as LCD devices and organic electro-luminance devices may include pixels having switching elements and a display substrate having display signal lines.

These display devices such as the LCD devices and organic electro-luminance devices must go through visual inspection test processes that test the state of the signal lines after being assembled. When the visual inspection test is performed, gate signals are applied to turn on all of the switching elements through a test pad, and data signals are applied to the pixels through another test pad for inspecting the state of the pixels. The data signals are applied to the pixels by a laser trimming procedure in which the data signals are applied after all of the data signal lines are connected together. The connected signal lines are separated after the visual inspection is completed. The laser trimming procedure may make the manufacturing process more complex and may increase manufacturing time.

SUMMARY

Aspects of embodiments of the present invention are directed toward an array substrate, a display apparatus including the same, and a method of operating the display apparatus.

An aspect of an embodiment is directed toward an array substrate capable of skipping a laser trimming procedure and reducing circuit area.

An aspect of an embodiment is directed toward a display device including the array substrate.

An aspect of an embodiment is directed toward a method of operating the display device.

According to an embodiment, an array substrate includes: a display area including a plurality of pixels coupled to a plurality of gate lines and a plurality of data lines; a data driving unit, coupled to a fan-out unit and configured to drive the data lines; a first switching circuit between the display area and the data driving unit and configured to skip a laser trimming process in an inspection mode, and configured to control the data lines to share electric charges in an image display mode; and a second switching circuit coupled to the fan-out unit via a fuse unit and configured to deliver an inspection signal to each of the pixels through the data lines in the inspection mode, and configured to be disconnected from the fan-out unit in the image display mode.

The first switching circuit may include a plurality of pre-charge sharing (PCS) switches, each of the PCS switches having a first terminal coupled to a corresponding one of the data lines, a second terminal coupled to at least one sharing line, and a control terminal coupled to a first control line, and the second switching circuit may include a plurality of laser trimming skip (LTS) switches, each of the LTS switches having a first terminal coupled to at least one inspection line that is coupled to the at least one sharing line, a second terminal coupled to a corresponding fuse of a plurality of fuses in the fuse unit, and a control terminal coupled to a second control line.

The first control line may be configured to receive a first switching control signal for turning off the PCS switches in the inspection mode, and the second control line may be configured to receive a second switching control signal for turning on the LTS switches in the inspection mode.

The inspection signal may be applied to the at least one inspection line in the inspection mode to inspect whether a corresponding one of the pixels is electrically faulty.

Each of the fuses may be configured to be opened upon receiving a current above a level from the at least one inspection lines in the inspection mode.

The at least one sharing line may include first and second sharing lines, and the PCS switches may include a plurality of first switches and a plurality of second switches, each of the first switches having the second terminal coupled to the first sharing line and the first terminal coupled to an odd data line of the data lines, and each of the second switches having the second terminal coupled to the second sharing line and the first terminal coupled to an even data line of the data lines.

The at least one inspection line may include first and second inspection lines, and the LTS switches may include a plurality of third switches and a plurality of fourth switches, each of the third switches having the first terminal coupled to the first inspection line and the second terminal coupled to a corresponding one of the fuses corresponding to the odd data line of the data lines, and each of the fourth switches having the first terminal coupled to the second inspection line and the second terminal coupled to a corresponding one of the fuses corresponding to the even data line of the data lines.

The inspection signal may include first and second inspection signals having different polarities with respect to each other, and the first and second inspection signals may be respectively applied to the first and second inspection lines in the inspection mode.

Each of the PCS switches may include a metal oxide semiconductor (MOS) transistor having a size for charging the shared electric charges, and each of the LTS switches may include a MOS transistor having a size smaller than the size of the PCS switch.

Each of the PCS switches may include an n-type MOS transistor.

Each of the LTS switches may include a p-type MOS transistor.

The data driving unit may be on an area which is substantially overlapped with the fuse unit and the second switching circuit.

The array substrate of claim 1 may further include a gate driving unit configured to drive the gate lines.

According to another embodiment of the present invention, a liquid crystal display (LCD) device includes: a display panel including a plurality of pixels coupled to a plurality of gate lines and a plurality of data lines; a data driving unit configured to apply data signals to the display panel through a fan-out unit according to a data control signal; a first switching circuit configured to be inserted between the display panel and the data driving unit in an inspection mode, and configured to control the data lines to share electric charges in an image display mode, in response to a mode control signal; a second switching circuit, coupled to the fan-out unit via a fuse unit and configured to deliver inspection signals to each of the pixels through the data lines in the inspection mode and configured to be disconnected from the fan-out unit in the image display mode, in response to the mode control signal; a gate driving unit configured to apply gate signals corresponding to scan pulses to the display panel based on a gate control signal; and a timing controller configured to generate the data control signal, the gate control signal and the mode control signal.

The first switching circuit may control the data lines to share the electric charges in response to a charge-sharing control signal provided from the timing controller in the image display mode.

The first switching circuit may control the data lines to share the electric charges in response to the charge-sharing control signal per each frame.

The first switching circuit may control the data lines to share the electric charges in response to the charge-sharing control signal per each horizontal synchronization period.

The first switching circuit may control the data lines such that odd data lines of the data lines share the electric charges and even data lines of the data lines share the electric charges in response to a charge-sharing control signal provided from the timing controller in the image display mode.

The first switching circuit may control the data lines such that the odd data lines of the data lines share the electric charges and the even data lines share the electric charges in response to the charge-sharing control signal per each frame.

The first switching circuit may control the data lines such that the odd data lines of the data lines share the electric charges and the even data lines share the electric charges in response to the charge-sharing control signal per each horizontal synchronization period.

According to another embodiment of the present invention, a method of operating a display device includes: performing a visual inspection on a plurality pixels by using a first switching circuit and a second switching circuit as a laser trimming skip (LTS) switch, the first switching circuit being inserted between a display panel and a data driving unit, and the pixels being in the display panel; driving a plurality of data lines by using the data driving unit, each of the data lines being coupled to each of the pixels; and controlling the data lines to share electric charges by using the first switching circuit as a pre-charge sharing (PCS) switch.

The data lines may be controlled to share the electric charges before or after the pixels are charged.

According to example embodiments, a laser trimming procedure may be skipped, and the occupied circuit area may be reduced because the first switching circuit operates as the LTS switch in the inspection mode and operates as the PCS switch in the image display mode.

BRIEF DESCRIPTION OF THE DRAWINGS

Example embodiments can be understood in more detail from the following description taken in conjunction with the accompanying drawings.

DETAILED DESCRIPTION

Figure 1:
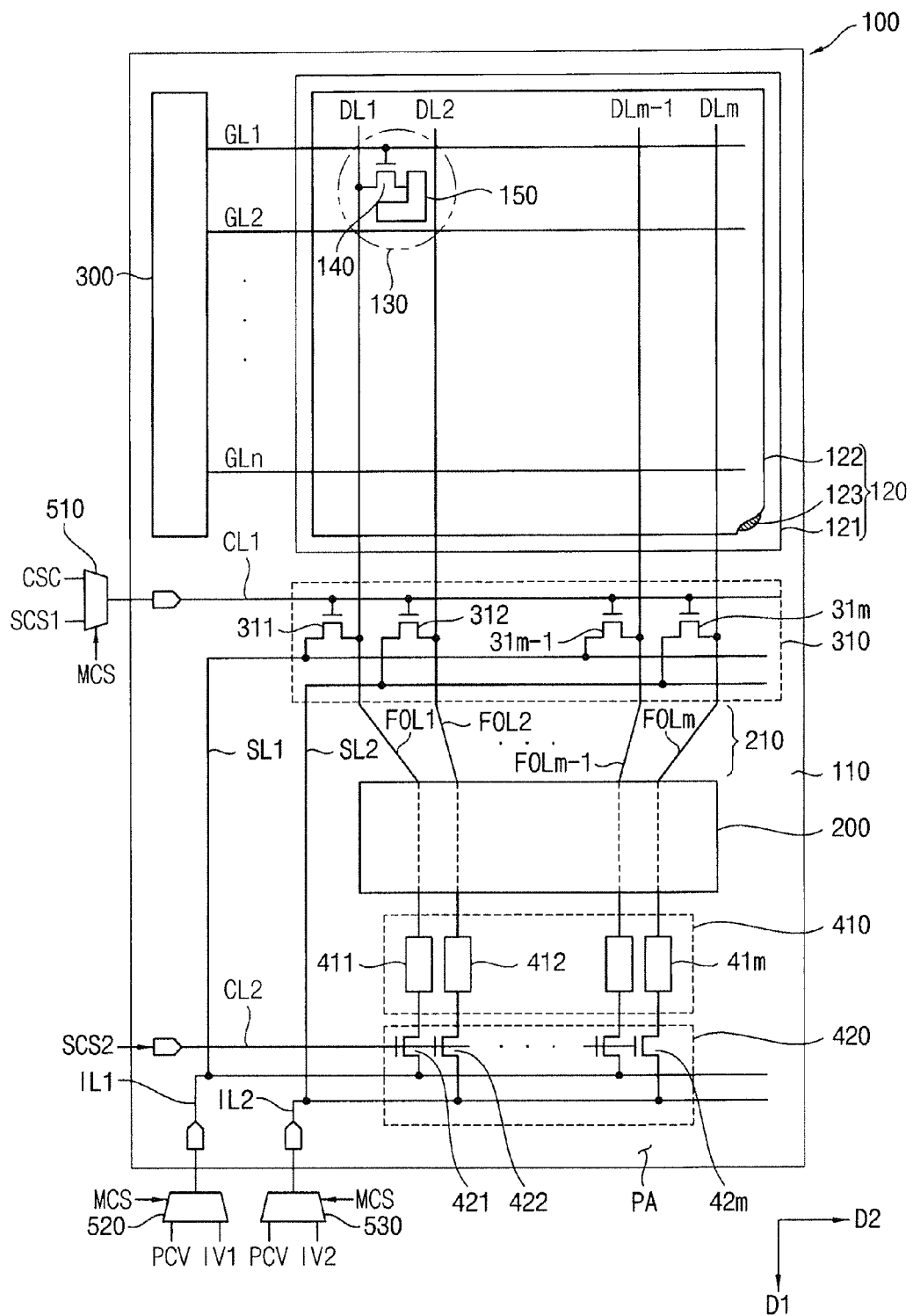
FIG. 1 is a block diagram illustrating an array substrate according to some example embodiments.

The example embodiments are described more fully hereinafter with reference to the accompanying drawings. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present therebetween. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer, pattern or section from another element, component, region, layer, pattern or section. Thus, a first element, component, region, layer, pattern or section discussed below could be termed a second element, component, region, layer, pattern, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the present invention. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an array substrate according to some example embodiments.

Referring to FIG. 1, an array substrate 100 includes a base substrate 110, a plurality of data lines DL1~DLm, (where m is an even number greater than two), a plurality of gate lines GL1~GLn, (where n is a natural number greater than two) and a plurality of pixels 130. In one example embodiment, the base substrate 110 includes a material that allows light to pass therethrough, for example glass, quartz, sapphire or silicon. The base substrate 110 is divided into a display area 120 and a peripheral area PA, which surrounds the display area 120. The image is not displayed in the peripheral area PA.

The data lines DL1~DLm are formed on the base substrate 110 while extending in a first direction D1. The data lines DL1~DLm are aligned in a second direction D2, which is substantially perpendicular to the first direction D1, while being spaced apart from each other. In one example embodiment, the data lines DL1~DLm include a metallic material and first ends of the data lines DL1~DLm are electrically connected with a data driver 200, which is mounted on the peripheral area PA. The data lines DL1~DLm are connected with pixels 130 so as to provide data signals from the data driver 200 to the pixels 130.

The gate lines GL1~GLn are formed on the base substrate 110, and are aligned perpendicular to the data lines DL1~DLm while being insulated from the data lines DL1~DLm. That is, the gate lines GL1~GLn extend in the second direction D2 and are spaced apart from each other in the first direction D1. In one example embodiment, the gate lines GL1~GLn include a metallic material and first ends of the gate lines GL1~GLn are electrically connected with a gate driving unit 300, which is mounted on the peripheral area PA. The gate lines GL1~GLn are connected to the pixels to provide the gate signals generated from the gate driving unit 300 to the pixels 140.

The pixels 130 are formed on the display area 120 in the base substrate 110. The pixels 120 are aligned in the form of an array to display an image.

Each pixel 130 includes a switching element 140 that may be implemented with a thin film transistor (TFT), and which is electrically connected to a corresponding data line DL1 and a corresponding gate line GL1, and a pixel electrode 150 which is electrically connected to the switching element 140.

The display area 120 includes a lower substrate 121, an upper substrate 122 and a liquid crystal layer 123 formed between the lower substrate 121 and the upper substrate 122. The gate lines GL1~GLn, the data lines DL1~DLm, the TFT 140 and the pixel electrodes 150 are arranged in the lower substrate 121. Common electrodes are arranged in the upper substrate 122.

Figure 2:
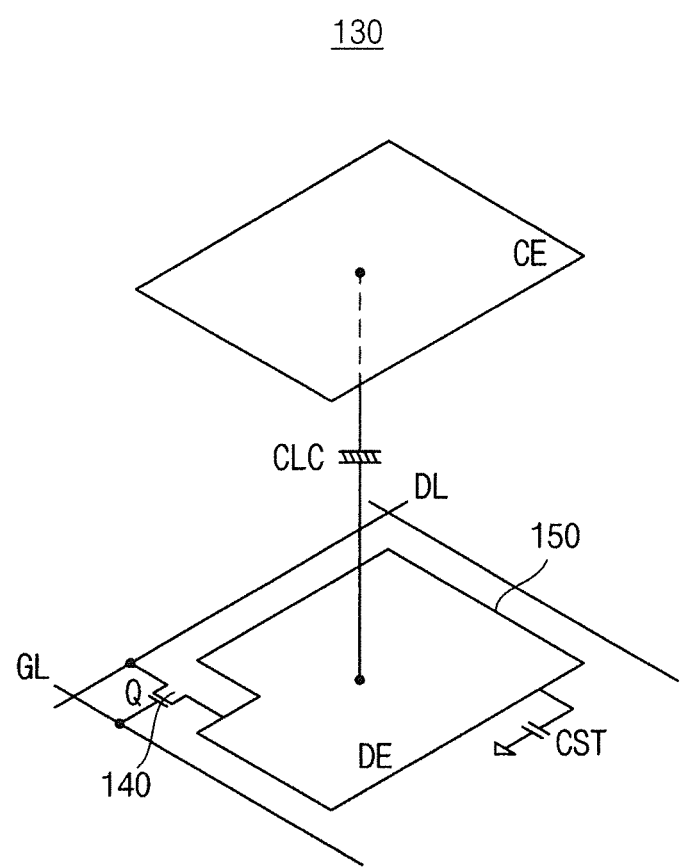
FIG. 2 is a diagram illustrating a structure of each pixel in FIG. 1.

FIG. 2 is a diagram illustrating a structure of each pixel in FIG. 1.

Referring to FIG. 2, each of the pixels 130 may include a switching element Q or 140, a liquid crystal capacitor CLC, and a storage capacitor CST.

The switching element 140 may be placed on a lower display substrate. The switching element 140 (e.g., a thin film transistor) may provide a data signal to the liquid crystal capacitor CLC in response to a gate signal. As illustrated in FIG. 2, the gate signal may be input from a gate-line GL, and the data signal may be input from a data-line DL. The switching element Q may be coupled to the gate-line GL via its gate terminal, may be coupled to the data-line DL via its source terminal, and may be coupled to the liquid crystal capacitor CLC via its drain terminal. The liquid crystal capacitor CLC may be charged by a voltage difference between the data signal and the common voltage. The data signal may be applied to the pixel electrode DE of the liquid crystal capacitor CLC, and the common voltage may be applied to the common electrode CE of the liquid crystal capacitor CLC. As described above, the liquid crystal layer may be placed between the pixel electrode 150 and the common electrode CE. Hence, the light transmittance of the liquid crystal layer may be controlled by an intensity of the electric field formed between the pixel electrode 150 and the common electrode CE (i.e., referred to as a charged voltage). In case of a normally black mode, for example, the light transmittance of the liquid crystal layer may increase as the intensity of the electric field formed between the pixel electrode 150 and the common electrode CE increases. On the other hand, the light transmittance of the liquid crystal layer may decrease as the intensity of the electric field formed between the pixel electrode 150 and the common electrode CE decreases. In some example embodiments, the liquid crystal capacitor CLC may include the pixel electrode DE formed on the lower display substrate, the common electrode CE formed on the upper display substrate, and the liquid crystal layer placed between the pixel electrode 150 and the common electrode CE. However, the structure of the liquid crystal capacitor CLC is not limited thereto. For example, the common electrode CE of the liquid crystal capacitor CLC may be formed on the lower display substrate. In this case, the common electrode CE may receive the common voltage from a signal line formed on the lower display substrate. In addition, the pixel electrode 150 is coupled to the drain terminal of the switching element 140 so that the pixel electrode 150 may receive the data signal from the data-line DL coupled to the source terminal of the switching element 140.

In one example embodiment, a low common voltage may be applied to the pixels 120 when a data signal of positive polarity is applied to the pixels 130. On the other hand, a high common voltage may be applied to the pixels 130 when a data signal of negative polarity is applied to the pixels 130. As a result, the charged voltage (i.e., the intensity of the electric field formed between the pixel electrode 150 and the common electrode CE) is greater than a voltage level of the data signal so that power consumption may be substantially reduced. The storage capacitor CST may maintain the charged voltage of the liquid crystal capacitor CLC. That is, the storage capacitor CST may assist the liquid crystal capacitor CLC. The storage capacitor CST may be formed by placing an insulator between the pixel electrode DE and the signal line. In some example embodiments, each of the pixels 130 may not include the storage capacitor CST. Color filters may be arranged on the upper substrate 122. Polarizing plates may be attached to the upper substrate 122, and/or the lower substrate 121.

Figure 3:
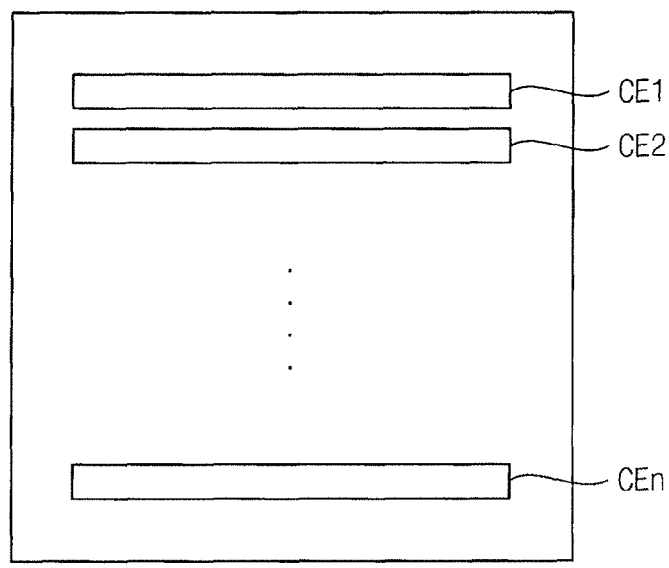
FIG. 3 is a diagram illustrating an upper substrate of the display area in the array substrate of FIG. 1.

FIG. 3 is a diagram illustrating an upper substrate of the display area in the array substrate of FIG. 1.

Referring to FIG. 3, the upper substrate 122 may include a plurality of common electrodes CE1~CEn. The common electrodes CE1~CEn may be opposite to the pixel electrodes 150 of the lower substrate 121. The common electrodes CE1~CEn that are spaced apart from each other may run parallel with the gate-lines GL1~GLn. For example, the first common electrode CE1 may be opposite to the pixel electrodes 150 and arranged in a direction of the first gate-line GL1.

The liquid crystal capacitor CLC may include a first electrode, a second electrode, and a liquid crystal layer. The first electrode may correspond to the pixel electrode 150 that is formed on the lower substrate 121. The second electrode may correspond to the common electrode CE that is formed on the upper substrate 122. The liquid crystal layer may correspond to a dielectric anisotropy material that is placed between the first electrode and the second electrode. Thus, the liquid crystal capacitor CLC may have a specific capacitance. In addition, the storage capacitor CST may maintain a charged voltage of the liquid crystal capacitor CLC.

Figure 4:
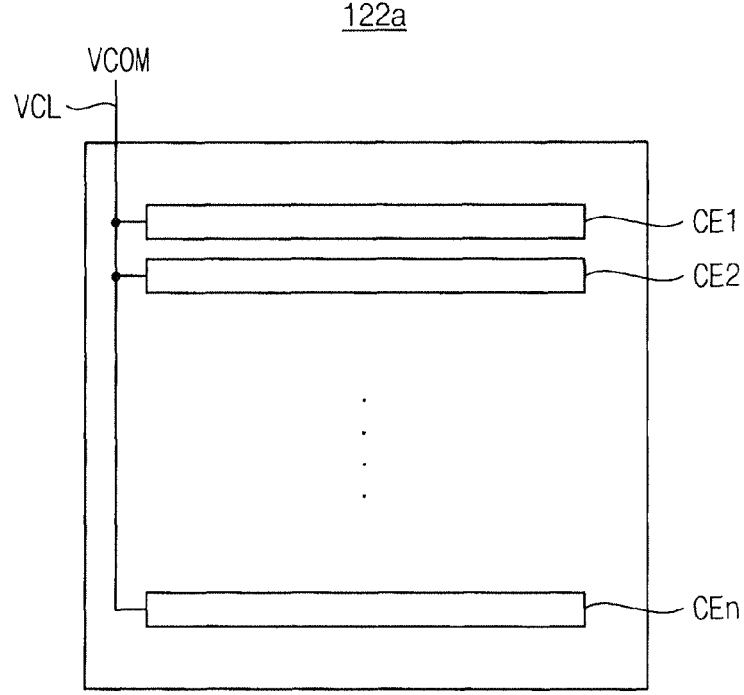
FIG. 4 is a diagram illustrating a common voltage connection example embodiment of the upper substrate of the display area in the array substrate of FIG. 1.

FIG. 4 is a diagram illustrating a common voltage connection example embodiment of the upper substrate of the display area in the array substrate of FIG. 1.

Referring to FIG. 4, an upper substrate 122a may include a common voltage line VCL and a plurality of common electrodes CE1~CEn. The common electrodes CE1~CEn may be opposite to the pixel electrodes DE that are formed on the lower substrate 121. The common electrodes CE1~CEn are coupled to the common voltage line VCL.

A voltage generator may generate a common voltage VCOM to apply the common voltage VCOM into the common voltage line VCL. Hence, all pixels 130 in the display area 120 may receive the common voltage VCOM. In case that the display area 120 includes the upper substrate 122a as illustrated in FIG. 4, the display area 120 may employ a frame inversion technique.

Figure 5:
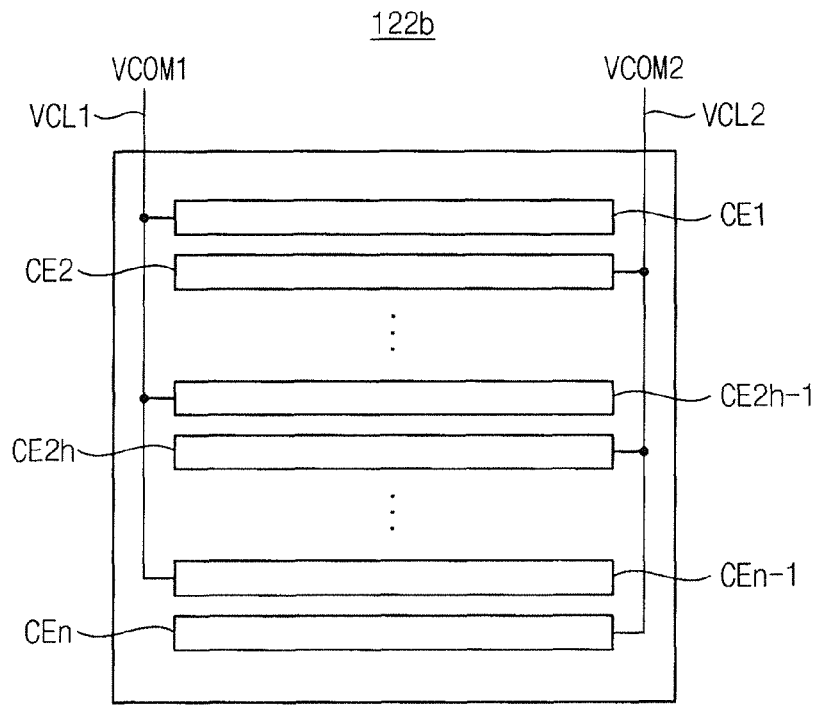
FIG. 5 is a diagram illustrating another common voltage connection example embodiment of the upper substrate of the display area in the array substrate of FIG. 1.

FIG. 5 is a diagram illustrating another common voltage connection example embodiment of the upper substrate of the display area in the array substrate of FIG. 1.

Referring to FIG. 5, an upper substrate 122b may include a first common voltage line VCL1, a second common voltage line VCL2, and a plurality of common electrodes CE1~CEn. The common electrodes CE1~CEn may be opposite to the pixel electrodes 150 that are formed on the lower substrate 121. Here, first common electrodes may be coupled to the first common voltage line VCL1, and second common electrodes may be coupled to the second common voltage line VCL2. The first common electrodes and the second common electrodes may be alternately arranged on the upper substrate 122. For example, the first common electrodes may be odd common electrodes, and the second common electrodes may be even common electrodes. Alternatively, the first common electrodes may be even common electrodes, and the second common electrodes may be odd common electrodes. In FIG. 5, it is illustrated that the first common electrodes are odd common electrodes, and that the second common electrodes are even common electrodes. Here, h denotes a positive integer. The first common electrodes may be opposite to the pixel electrodes 150 that are coupled to the first gate lines. The second common electrodes may be opposite to the pixel electrodes 150 that are coupled to the second gate lines. The first gate lines may be odd gate-lines, and the second gate-lines may be even gate lines. Alternatively, the first gate-lines may be even gate-lines, and the second gate-lines may be odd gate lines.

The voltage generator may generate the first common voltage VCOM1 and the second common voltage VCOM2. Here, a polarity inversion period of the first common voltage VCOM1 may be the same as a polarity inversion period of the second common voltage VCOM2. In addition, a polarity of the first common voltage VCOM1 may be opposite to a polarity of the second common voltage VCOM2. In one example embodiment, a polarity of the first common voltage VCOM1 and a polarity of the second common voltage VCOM2 may be periodically inverted with an interval of the period T (e.g., the predetermined period T). In another example embodiment, a polarity of the first common voltage VCOM1 and a polarity of the second common voltage VCOM2 may be periodically and concurrently inverted (e.g., periodically inverted at the same time). The first common voltage VCOM1 may be applied to the first common voltage line VCL1, and the second common voltage VCOM2 may be applied to the second common voltage line VCL2. Hence, for example, the first common voltage VCOM1 may be applied to the pixels that are coupled to the odd gate-lines, and the second common voltage VCOM2 may be applied to the pixels that are coupled to the even gate-lines. Alternatively, the first common voltage VCOM1 may be applied to the pixels P that are coupled to the even gate-lines, and the second common voltage VCOM2 may be applied to the pixels P that are coupled to the odd gate-lines. When the display area 120 includes the upper substrate 122b as illustrated in FIG. 5, the display area 120 may employ a line inversion technique.

Referring back to FIG. 1, the array substrate 100 may further include a first switching circuit 310, a fan-out unit 210, a fuse unit 410, a second switching circuit 420 and selection circuits 510, 520 and 530.

The first switching circuit 310 may be inserted between the display area 120 and the fan-out unit 210. The first switching circuit 310 includes a plurality of pre-charge sharing (PCS) switches 311~31m. The PCS switches 311~31m may be implemented with metal-oxide semiconductor (MOS) transistors. Each of the PCS switches 311~31m has a gate (control terminal) connected to a first control line CL1, a first terminal connected to at least one sharing line of the first and second sharing lines SL1 and SL2, and a second terminal connected to a corresponding one of the data lines DL1~DLm. First switches (or odd switches) 311, 313, ..., 31m-1 of the PCS switches 311~31m are connected to the first sharing line SL1 and odd data lines DL1, DL3, ..., DLm-1, and second switches (or even switches) 312, 314, ..., 31m of the PCS switches 311~31m are connected to the second sharing line SL2 and even data lines DL2, DL4, ..., DLm. Each gate of the PCS switches 311~31m receives one of a first switching control signal SCS1 and a charge sharing control signal CSC through the first control line CL1 according to an operation mode. For example, when the operation mode is an inspection mode, each gate of the PCS switches 311~31m receives the first switching control signal SCS1 through the first control line CL1. In the inspection mode, the PCS switches 311~31m are turned off in response to the first switching control signal SCS1. When the PCS switches 311~31m are turned off, a short test and an open test may be performed on the fan-out unit 210, while the laser trimming procedure may be skipped because of the PCS switches 311~31m.

When the operation mode is an image display mode, the PCS switches 311~31m are turned on in response to the charge sharing control signal CSC. When the PCS switches 311~31m are turned on in the image display mode, the data lines DL1~DLm may be connected together and thus electric charges may be shared between the data lines DL1~DLm. The PCS switches 311~31m may be turned on before or after the pixels 130 connected to each of the gate lines GL1~GLm are charged, and thus the data lines DL1~DLm may share the electric charges. In some embodiments, the PCS switches 311~31m are turned on before or after the pixels 130 connected to each of the gate lines GL1~GLm are charged so that the odd data lines DL1, DL3, ..., DLm-1 may share the electric charges. In some embodiments, the PCS switches 311~31m connected to each of the data lines DL1~DLm are turned on before or after the pixels 130 connected to the gate lines GL1~GLm are charged so that the even data lines DL2, DL4, ..., DLm may share the electric charges. Therefore, the charge sharing control signal CSC may be a pre-charge sharing (PCS) signal.

In some embodiments, each of the PCS switches 311~31m has a size that is sufficient for charging the shared electric charges. In addition, the PCS switches 311~31m may be n-type MOS (NMOS) transistors. Alternatively, the PCS switches 311~31m may be p-type MOS (PMOS) transistors.

The selection circuit 510 selects one of the first switching control signal SCS1 and the charge sharing control signal CSC, and provides the selected one to the first control line CL1 in response to a mode control signal MCS. When the operation mode is the inspection mode, the mode control signal MCS may be a first logic level, and the selection circuit 510 selects the first switching control signal SCS1. When the operation mode is the image display mode, the mode control signal MCS may be a second logic level, and the selection circuit 510 selects the charge sharing control signal CSC. The selection circuit 510 may be implemented with a multiplexer or other circuit element capable of performing the function of the multiplexer.

The fan-out unit 210 includes a plurality of fan-out lines FOL1~FOLm. Each of the fan-out lines FOL1~FOLm has a first end connected to each of the data lines DL1~DLm. Each of the fan-out lines FOL1~FOLm has a second end which is connected to each fuse of a plurality of fuses 411~41m in the fuse unit 410 in the inspection mode, and connected to data driving unit 200 in the image display mode. Each of the fan-out lines FOL1~FOLm may have a different length but the same resistance. For the same resistance, each of the fan-out lines FOL1~FOLm may have a different shape.

The fuse unit 410 include the fuses 411~41m. Each of the fuses 411~41m has a first end connected to each of the fan-out lines FOL1~FOLm and a second end connected to the second switching circuit 420.

The second switching circuit 420 includes a plurality of laser trimming skip (LTS) switches 421~42m. The LTS switches 421~42m may be implemented with MOS transistors. Each of the LTS switches 421~42m has a gate connected to the second control line CL2, and a first terminal connected to at least one inspection line of first and second inspection lines IL1 and IL2. In addition, each of the LTS switches 421~42m has a second terminal connected to a corresponding one of the fuses 411~41m. First switches (or odd switches) 421, 423, ..., 42m-1 of the LTS switches 421~42m are connected to the first inspection line IL1 and odd fuses 411, 413, ..., 41m-1, and second switches (or even switches) 422, 424, ..., 42m of the LTS switches 421~42m are connected to the second inspection line IL2 and even fuses 412, 414 ..., 41m.

Each gate of the LTS switches 421~42m receives a second switching control signal SCS2 through the second control line CL2. When the operation mode is the inspection mode, a logic level of the second switching control signal SCS2 may differ according to the kind of inspection. For example, when the inspection is associated with fan-out open, the LTS switches 421~42m may be turned off in response to the second switching control signal SCS2. When the inspection is associated with visual inspection, the LTS switches 421~42m may be turned on in response to the second switching control signal SCS2. When the LTS switches 421~42m are turned on in response to the second switching control signal SCS2, inspection signals IV1 and IV2 are passed to the pixels 130 through the first and second inspection lines IL1 and IL2 and the data lines DL1~DLm, and the visual inspection is performed on the pixels 130 based on the inspection signals IV1 and IV2. The LTS switches 421~42m may be implemented with NMOS transistors. Alternatively, the LTS switches 421~42m may be implemented with PMOS transistors.

When the operation mode is the image display mode, the LTS switches 421~42m may be turned off in response to the second switching control signal SCS2, and the fuses 411~41m may be opened due to the magnitude of currents which are delivered to the fuses 411~41m through the inspection lines IL1 and IL2.

Figure 6:
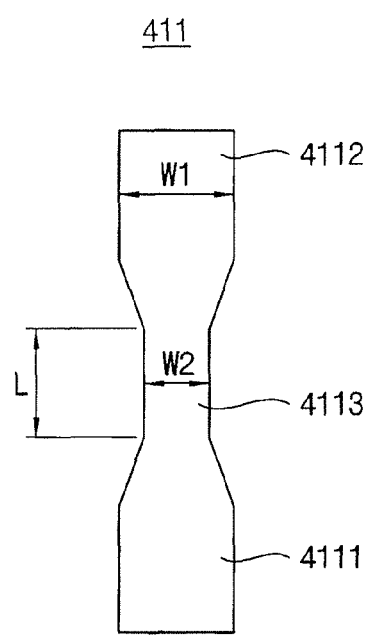
FIG. 6 illustrates each fuse included in the fuse unit in FIG. 1.

FIG. 6 illustrates each fuse included in the fuse unit in FIG. 1.

In FIG. 6, the architecture of the fuse 411 is described for an example, and other fuses 412~41m may have the same architecture as the fuse 411.

The fuse 411 includes an input part 4111, an output part 4112 and a short part 4113 that connects the input part 4111 and the output part 4112. The input part 4111 is connected to the LTS switch 421, and the output part 4112 is connected to the fan-out line FOL1. In the inspection mode, the inspection signal IV1 applied through the first inspection line IL1 is delivered to the data line DL1 through the input part 4111, the short part 4113, the output part 4112 and the fan-out line FOL1. The inspection signal IV1 received at the data line DL1 is passed to the pixel 130, and the pixel 130 displays an image corresponding to the inspection signal IV1. Whether the data line DL1 is opened or not and whether the pixel 130 is faulty or not are detected by the image displayed in the pixel 130. When the visual inspection using the inspection signals IV1 and IV2 applied to the array substrate 100 is completed, the fuses 411~41m in the fuse unit 410 are opened. When the fuses 411~41m are opened, each of the LTS switches 421~42m is electrically disconnected from each of the data lines DL1~DLm.

In more detail, when a current that is higher than a reference current (e.g., a predefined reference current) is applied to the input part 4111 of the fuse 411, the short part 4113 of the fuse 411 is burned to open the fuse 411. The reference current (e.g., the predefined reference current) represents the maximum current that allows the short part 4113 to be not opened, and the maximum current of the inspection signals IL1 and IL2 is equal to or lower than the reference current (e.g., the predefined reference current). The width of the input part 4111 and the width of the output part 4112 may be substantially the same (or be the same) as W1. In addition, the width of the short part 4113 may be W2, and the length of the short part 4113 may be L.

In the image display mode, when the fuses 411~41m are opened or the LTS switches 421~42m are turned off, a precharge voltage PCV is applied to the first and second sharing lines SL1 and SL2. When the precharge voltage PCV is applied to the first and second sharing lines SL1 and SL2 and the PCS switches 311~31m, the data lines DL1~DLm may share the electric charges.

The selection circuit 530 selects one of the precharge voltage PCV and the second inspection signal IV2 in response to the mode control signal MCS. When the operation mode is the inspection mode, the mode control signal MCS may have a first logic level, and the selection circuit 530 selects the second inspection signal IV2 to be provided to the second inspection line IL2. When the operation mode is the image display mode, the mode control signal MCS may have a second logic level, and the selection circuit 530 selects the precharge voltage PCV to be provided to the second sharing line SL2.

Figure 7:
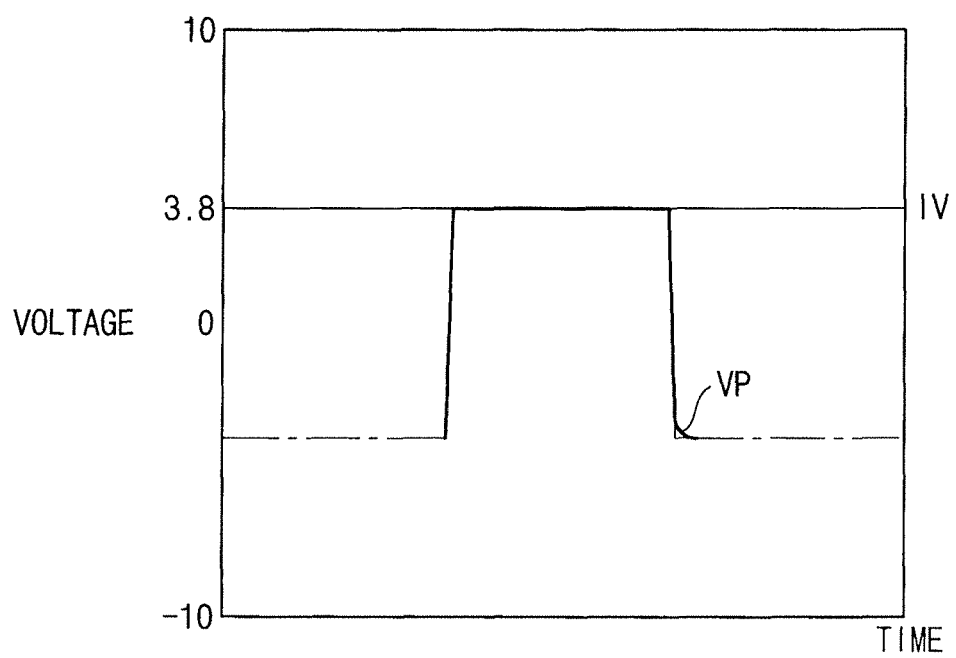
FIG. 7 is a signal waveform diagram illustrating visual inspection according to some example embodiments.

FIG. 7 is a signal waveform diagram illustrating visual inspection according to some example embodiments.

Referring to FIG. 1, in the inspection mode, the inspection signals IV1 and IV2 are delivered to the pixels 130, and luminance of the pixels 130 in response to the inspection signals IV1 and IV2 are measured. A turning-on voltage of the LTS switches 421~42m may be applied through the second control line CL2. In one example embodiment, when the LTS switches 421~42m are implemented with PMOS transistors, the second switching control signal SCS2 has a voltage level of about −10V. In another example embodiment, when the LTS switches 421~42m are implemented with NMOS transistors, the second switching control signal SCS2 has a voltage level of about 10V. The first inspection signal IV1 may have a voltage corresponding to the highest gray level of the pixel 130, for example, 3.8V. The first inspection signal IV1 may have a voltage, for example, 3.8V, for preventing degradation of the pixel 130. The first and second inspection signals IV1 and IV2 may correspond to other gray levels (or gray scales) per frame. When the LTS switches 421~42m are turned on in response to the second switching control signal SCS2, the first and second inspection signals IV1 and IV2 are applied to the data lines DL1~DLm.

When the first and second inspection signals IV1 and IV2 are applied to the data lines DL1~DLm, the gate driving unit 300 outputs a gate-on voltage to the corresponding gate line GLi (i is one of 1~n), and the switching element 140 of the corresponding pixel is turned on by the gate-on voltage. Then, the inspection signal IL1 is charged to the liquid crystal capacitor CLC, thereby causing (or transmitting) luminance of light thereof. After the luminance of the corresponding pixel 130 is measured by eyes or apparatus, a defective cell can be detected. In addition, as illustrated in FIG. 7, a charging rate of each pixel 130 is determined after the pixel voltage VP corresponding to the measured luminance is calculated, and the calculated pixel voltage VP is compared with the first inspection signal IV.

The visual inspection may be performed on all of the pixels 130 by applying the data-on voltage to the all of the gate lines GL1~GLn in turn, and LTS switches 421~42m are turned off by applying the second switching control signal SCS2 to the second control line CL2 after the visual inspection is completed. In some embodiments, after the LTS switches 421~42m are turned on, the fuses 411~41m may be opened by applying a current that is higher than the reference current (e.g., the predetermined reference current) to the first and second inspection lines IL1 and IL2.

Referring again to FIG. 1, the data driving unit 200 may be mounted on an area which is substantially overlapped with the fuse unit 410 and the second switching circuit 420. For example, after the fuse unit 410 and the second switching circuit 420 are mounted, the visual inspection is performed. When the visual inspection is completed, the data driving unit 200 is mounted on an area which is substantially overlapped with the fuse unit 410 and the second switching circuit 420 after the fuses 411~41m are opened. That is, the fan-out unit 210 is connected to the fuse unit 410 at first, and the fan-out unit 210 is connected to the data driving unit 200 after the visual inspection is completed. In some embodiments, the LTS switches 421~42m in the second switching circuit 420 have a size smaller than the PCS switches 311~31m.

After the data driving unit 200 is mounted, the data lines DL1~DLm are driven by the data driving unit 200. When the data lines DL1~DLm are driven by the data driving unit 200, at a particular time, the PCS switches 311~31m may be turned on in response to the first switching control signal SCS1 selected by the first selection circuit 510 after or before the pixels 130 are charged. When the PCS switches 311~31m are turned on, the precharge voltage PCV selected by the selection circuits 520 and 530 is delivered to the odd data lines DL1, DL3, . . . , DLm-1 and the even data lines DL2, DL4, . . . , DLm. Therefore, the electric charges are shared between the odd data lines DL1, DL3, . . . , DLm-1, and the electric charges are shared between the even data lines DL2, DL4, . . . , DLm. When the electric charges are shared between the data lines DL1~DLm before or after the pixels are charged, power consumption may be reduced in a case when the pixels need to display patterns which are variable, and the charging characteristic of the pixels may be enhanced. Accordingly, the overall performance of the array substrate 100 may be enhanced.

Typically, a display device may display an image by forming an electric field (i.e., an electric potential difference) between a pixel electrode and a common electrode of a liquid crystal capacitor included in each pixel. In the liquid crystal capacitor, a liquid crystal layer may be placed between the pixel electrode and the common electrode so that light transmittance of the liquid crystal layer may be controlled by an intensity of the electric field formed between the pixel electrode and the common electrode. Here, if the electric field is formed between the pixel electrode and the common electrode in one direction for a long time, the liquid crystal capacitor may be deteriorated due to polarization. Hence, the LCD device may periodically invert polarities of data signals to prevent the deterioration of the liquid crystal capacitor included in each pixel. For example, the LCD device may employ conventional inversion methods such as a dot inversion method, a line inversion method, a column inversion method, a frame inversion method, a Z-inversion method, an active level shift (ALS) inversion method, etc. The dot inversion method may invert polarities of data signals with respect to alternating dots. Namely, a certain pixel may receive a data signal having a polarity opposite to data signals received by its adjacent pixels in a vertical direction (i.e., a column direction) and a horizontal direction (i.e., a row direction). The line inversion method may invert polarities of data signals with respect to alternating gate-lines. The column inversion method may invert polarities of data signals with respect to alternating data-lines. The frame inversion method may invert polarities of data signals with respect to alternating frames. The Z-inversion method may arrange a plurality of pixels in zigzags across a column direction. Thus, the Z-inversion method may substantially perform the dot inversion when data signals are applied to the pixels in a similar way to the column inversion method. The ALS inversion method may substantially invert polarities of data signals in a similar way to the line inversion method. Here, the ALS inversion method may reduce a voltage displacement applied to a common electrode compared to the line inversion method.

In example embodiments, the charging characteristic of the pixels is enhanced by the electric charges being shared between data lines using the PCS switches 311~31m in addition to various inversion methods.

In some example embodiments, the selection circuits 510, 520 and 530 may be mounted on the array substrate 100. Although in FIG. 1 the selection circuits 510, 520 and 530 are arranged outside of the array substrate 100 for the convenience of the explanation, the selection circuits 510, 520 and 530 may actually be inside or outside of the array substrate 100.

Figure 8:
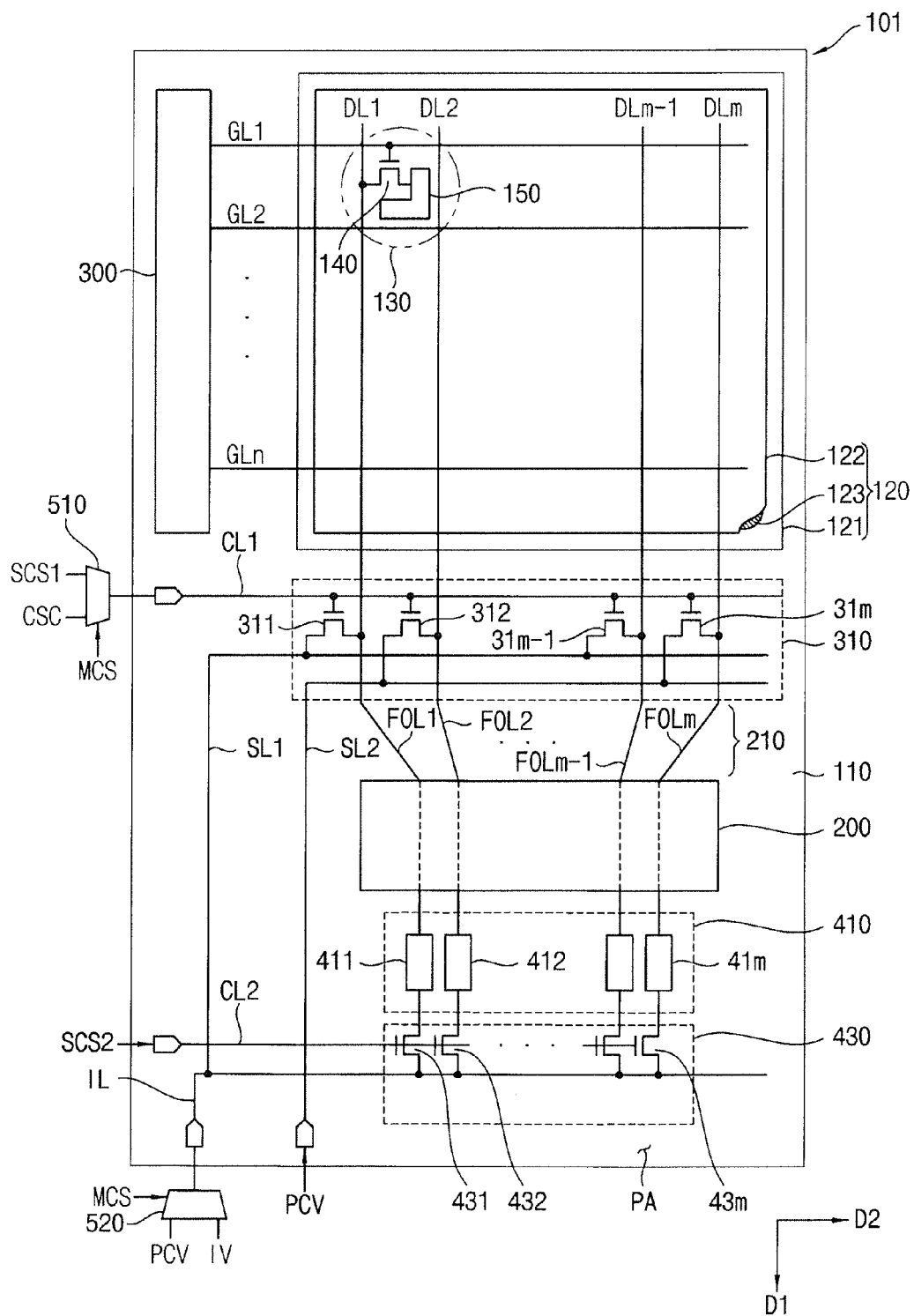
FIG. 8 is a block diagram illustrating an array substrate according to other example embodiments.

FIG. 8 is a block diagram illustrating an array substrate according to other example embodiments.

Referring to FIG. 8, an array substrate 101 includes a base substrate 110, data lines DL1~DLm, gate lines GL1~GLn, (where n is a natural number greater than two) and pixels 130 similar to the array substrate 100 in FIG. 1. In one example embodiment, the base substrate 110 includes a material that allows light to pass therethrough, for example glass, quartz, sapphire or silicon. The base substrate 110 is divided into a display area 120 and a peripheral area PA, which surrounds the display area 120. The image is not displayed in the peripheral area PA. In addition, the array substrate 101 may further include a first switching circuit 310, a fan-out unit 210, a fuse unit 410, a second switching circuit 430 and selection circuits 510 and 520. The array substrate 101 of FIG. 8 differs from the array substrate 100 of FIG. 1 in that the second switching circuit 430 is connected to one inspection line IL and only the first and selection circuits 510 and 520 are included.

Hereinafter, there will be description mainly about the second switching circuit 430 and the second selection circuit 520.

The second switching circuit 430 includes a plurality of laser trimming skip (LTS) switches 431~43m. The LTS switches 431~43m may be implemented with MOS transistors. Each of the LTS switches 431~43m has a gate connected to the second control line CL2, and a first terminal connected to an inspection line IL. In addition, each of the LTS switches 431~43m has a second terminal connected to a corresponding one of the fuses 411~41m.

Each gate of the LTS switches 431~43m receives a second switching control signal SCS2 through the second control line CL2. When the operation mode is the inspection mode, a logic level of the second switching control signal SCS2 may differ according to the kind of inspection. For example, when the inspection is associated with fan-out open, the LTS switches 431~43m may be turned off in response to the second switching control signal SCS2. When the inspection is associated with visual inspection, the LTS switches 431~43m may be turned on in response to the second switching control signal SCS2. When the LTS switches 431~43m are turned on in response to the second switching control signal SCS2, inspection signal IV is passed to the pixels 130 through the inspection line IL and the data lines DL1~DLm, and the visual inspection is performed on the pixels 130 based on the inspection signal IV. The LTS switches 431~43m may be implemented with NMOS transistors. Alternatively, the LTS switches 431~43m may be implemented with PMOS transistors.

When the operation mode is the image display mode, the LTS switches 431~43m may be turned off in response to the second switching control signal SCS2, and the fuses 411~41m may be opened due to the magnitude of currents which are delivered to the fuses 411~41m through the inspection line IL.

The second selection circuit 520 selects one of the precharge voltage PCV and the inspection signal IV in response to the mode control signal MCS. When the operation mode is the inspection mode, the mode control signal MCS may have a first logic level, and the second selection circuit 520 selects the inspection signal IV to be provided to the inspection line IL. When the operation mode is the image display mode, the mode control signal MCS may have a second logic level, and the second selection circuit 520 selects the precharge voltage PCV to be provided to the first sharing line SL1. The selected precharge voltage PCV is applied to the first sharing line SL1. When the LTS switches 311~31m are turned on in response to the first switching control signal SCS1, the electric charges are shared between the odd data lines DL1, DL3, ..., DLm-1, and the electric charges are shared between the even data lines DL2, DL4, ..., DLm.

In the example embodiments in FIGS. 1 and 8, the PCS switches 311~31m are connected to the first and second sharing lines SL1 and SL2. In other example embodiments, each first terminal of the PCS switches 311~31m may be connected to one sharing line. When each first terminal of the PCS switches 311~31m is connected to one sharing line, the PCS switches 311~31m may be turned on in response to the charge sharing signal (CSC) applied to the first control line CL1 in the image display mode, and the electric charges may be shared between the data lines DL1~DLm.

Figure 9:
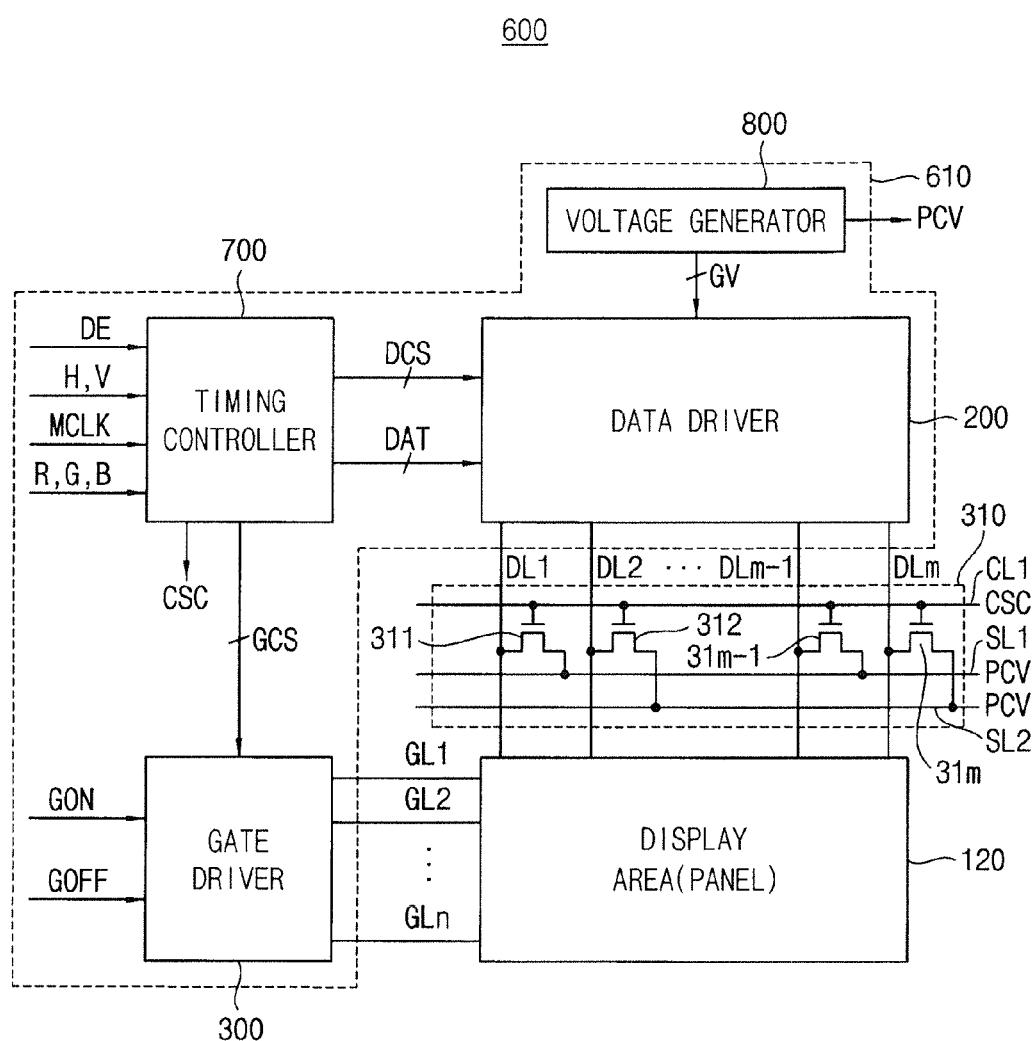
FIG. 9 is a block diagram illustrating a display device according to some example embodiments.

FIG. 9 is a block diagram illustrating a display device according to some example embodiments.

In FIG. 9, the fuse unit 410 and the second switching circuit 420 in the array substrate 100 are not illustrated. That is, FIG. 9 is an example embodiment in which the data driver 200 is mounted on the area which is substantially overlapped with the fuse unit 410 and the second switching circuit 420 in the array substrate 100. Although the fuse unit 410 and the second switching circuit 420 are not illustrated in FIG. 9, the display device 600 may include the fuse unit 410 and the second switching circuit 420.

Referring to FIG. 9, the display device 600 includes a display area (panel) 120, a data driver 200, a gate driver 300, a timing controller 700, a voltage generator 800 and a first switching circuit 310. In addition, the display device 600 further includes the fuse unit 410 and the second switching circuit 420, both of which are substantially overlapped with an area on which the data driver 200 is mounted.

The data driver 200, the gate driver 300, the timing controller 700 and the voltage generator 800 may be altogether referred as a driving circuit 610. That is, the driving circuit 610 includes the data driver 200, the gate driver 300, the timing controller 700 and the voltage generator 800.

The display area (display panel) 120 may display images based on data signals from the data driver 200 and gate signals (scan pulses) from the gate driver 300. The display area 120 includes a plurality of data lines DL1~DLm, a plurality of gate lines GL1~GLn, and a plurality of pixels 130, each being formed at a crossing region of the data lines DL1~DLm and the gate lines GL1~GLn.

The data driver 200 may apply data signals corresponding to images to the data lines DL1~DLm based on a data control signal DCS from the timing controller 700. Here, data signals may be generated by selecting gradation voltages GV generated by the voltage generator 800. The gradation voltages GV may correspond to image data DAT. In some embodiments, the voltage generator 800 may generate pairs of gradation voltages (i.e., one has positive polarity relative to a common voltage, and another has negative polarity relative to the common voltage). The data driver 200 may determine polarities of data signals by selecting gradation voltages of positive polarity, or gradation voltages of negative polarity. Hence, data signals may have positive polarity relative to the common voltage, or negative polarity relative to the common voltage. In some example embodiments, the data control signal DCS may include a polarity control signal that controls polarities of data signals. Based on the polarity control signal, the display device 600 may periodically invert polarities of data signals applied to the data lines DL1~DLm. In each frame, for example, the display device 600 may apply data signals of a first polarity to even data lines, and may apply data signals of a second polarity to odd data lines. As described above, the display device 600 may invert polarities of data signals provided to the display area 120 at each frame.

The gate driver 300 may apply gate signals into gate lines GL1~GLn of the display area 120 based on a gate control signal GCS. The gate control signal GCS may be output from the timing controller 700. In each frame, the gate signals may be sequentially shifted (i.e., a scan pulse). The timing controller 700 may generate the gate control signal GCS and the data control signal DCS, which control driving timings for the display device 600. In some example embodiments, the timing controller 700 may receive a R,G,B image signal, a horizontal synchronization signal H, a vertical synchronization signal V, a main clock signal MCLK, a data enable signal DE, etc. from an external graphic controller, and may generate the gate control signal GCS and the data control signal DCS based on the signals. For example, the gate control signal GCS may include a vertical synchronization start signal that controls an output start timing of gate signals, a gate clock signal that controls an output timing of gate signals, an output enable signal that controls a duration time of gate signals, etc. In addition, the data control signal DCS may include a horizontal synchronization start signal that controls an input start timing of data signals, a load signal that applies data signals to the data lines DL1~DLm, a polarity control signal that periodically inverts polarities of data signals, etc.

The voltage generator 800 may receive gamma voltages and generate the gradation voltage (or gray-scale voltage) GV. In addition, the voltage generator 800 may generate the precharge voltage PCV.

In some example embodiments, the data driver 200 and the gate driver 300 may be mounted on a tape carrier package (TCP), and the TCP may be attached to an assembly of the display panel 120. In addition, the data driver 200 and the gate driver 300 may be attached to a glass substrate by using a chip on glass mounting method.

In other example embodiments, the driving circuit 610 may be mounted on a flexible printed circuit (FPC) film, and the driving circuit 610 may be connected to the display panel 120.

When the driving circuit 610 is mounted on the FPC film, the first switching circuit 310 may be mounted on the display panel 120 or on the FPC film.

Although not illustrated, the display device 600 includes the selection circuits 510, 520 and 530 in FIG. 1. In addition, the display device 600 includes the first switching circuit 510 inserted between the data driver 200 and the display panel 120. The first switching circuit 310 may be inserted between the display area 120 and the fan-out unit 210. The first switching circuit 310 includes a plurality of pre-charge sharing (PCS) switches 311~31m. The PCS switches 311~31m may be implemented with metal-oxide semiconductor (MOS) transistors. Each of the PCS switches 311~31m has a gate (control terminal) connected to a first control line CL1, a first terminal connected to at least one sharing line including first and second sharing lines SL1 and SL2 and a second terminal connected to a corresponding one of the data lines DL1~DLm. First switches (or odd switches) 311, 313, . . . , 31m-1 of the PCS switches 311~31m are connected to the first sharing line SL1 and odd data lines DL1, DL3, . . . , DLm-1, and second switches (or even switches) 312, 314, . . . , 31m of the PCS switches 311~31m are connected to the second sharing line SL2 and even data lines DL2, DL4, . . . , DLm.

Each gate of the PCS switches 311~31m receives one of a first switching control signal SCS1 and a charge sharing control signal CSC through the first control line CL1 according to an operation mode. For example, when the operation mode is an inspection mode, each gate of the PCS switches 311~31m receives the first switching control signal SCS1 through the first control line CL1. In the inspection mode, the PCS switches 311~31m are turned off in response to the first switching control signal SCS1.

When the PCS switches 311~31m are turned off, a short test and an open test may be performed on the fan-out unit 210, while the laser trimming procedure may be skipped because of the PCS switches 311~31m.

When the operation mode is an image display mode, the PCS switches 311~31m are turned on in response to the charge sharing control signal CSC. When the PCS switches 311~31m are turned on in the image display mode, the data lines DL1~DLm may be connected together and thus electric charges may be shared between the data lines DL1~DLm. The PCS switches 311~31m are turned on before or after the pixels 130 connected to each of the gate lines GL1~GLm are charged, and thus the data lines DL1~DLm may share the electric charges. In some embodiments, the PCS switches 311~31m are turned on before or after the pixels 130 connected to each of the gate lines GL1~GLm are charged, so that the odd data lines DL1, DL3, . . . , DLm-1 may share the electric charges. In some embodiments, the PCS switches 311~31m connected to each of the data lines DL1~DLm are turned on before or after the pixels 130 connected to each of the gate lines GL1~GLm are charged, so that the even data lines DL2, DL4, . . . , DLm may share the electric charges. Therefore, the charge sharing control signal CSC may be a pre-charge sharing (PCS) signal.

In some embodiments, each of the PCS switches 311~31m has a sufficient size for charging the shared electric charges. In addition, the PCS switches 311~31m may be n-type MOS (NMOS) transistors. Alternatively, the PCS switches 311~31m may be p-type MOS (PMOS) transistors.

As described above, the display device 600 includes the second switching circuit 420 and the fuse unit 410. The first switching circuit 310 and the second switching circuit 420 operate as LTS switches in the inspection mode, and the first switching circuit 310 operates as the PCS switches for the electric charges being shared between the data lines in the image display mode. Therefore, the first switching circuit 310 operates as the LTS switch and the PCS switch according to the operation mode according to example embodiments. Accordingly, a laser trimming procedure may be skipped, occupied circuit area may be reduced and a charging characteristic of the pixels may be enhanced.

Figure 10:
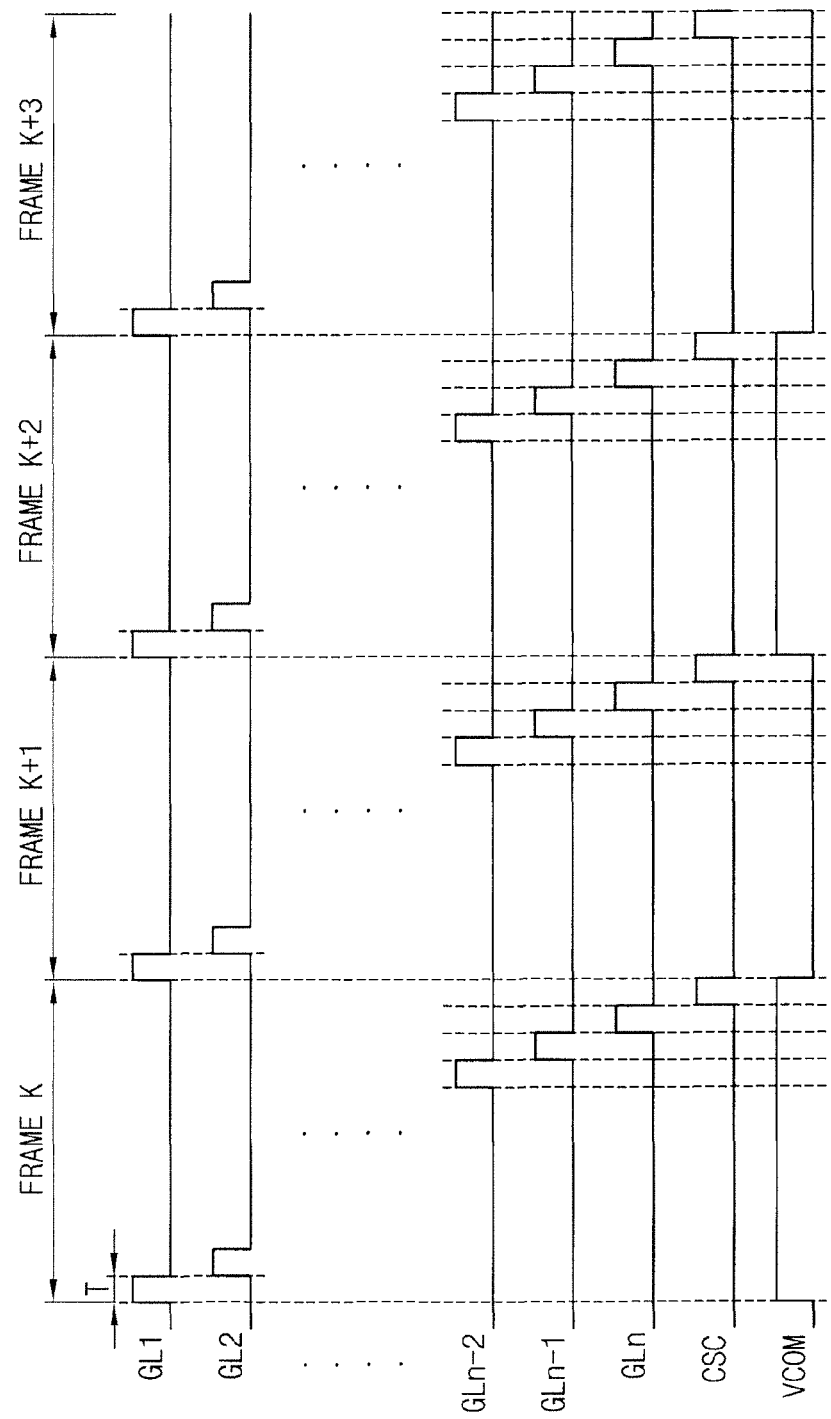
FIG. 10 is a timing diagram illustrating operation of the display device of FIG. 9.

FIG. 10 is a timing diagram illustrating operation of the display device of FIG. 9.

Referring to FIG. 10, the gate signal may be sequentially applied to the gate lines GL1~GLn based on the period T (e.g., the predetermined period T) during each frame. Here, a polarity of the common voltage VCOM may be periodically inverted in synchronization with a frame period. Namely, a frame period may be the same as a polarity inversion period of the common voltage VCOM. Further, a polarity of the common voltage VCOM may be inverted according to the same timing during each frame. For example, a polarity of the common voltage VCOM may be inverted when the gate signal is applied to a first gate-line GL1 during each frame (i.e., at a start timing point of each frame). As illustrated in FIG. 10, a polarity of the common voltage VCOM may be positive during the (k)th frame and the (k+2)th frame. In addition, a polarity of the common voltage VCOM may be negative during the (k+1)th frame and the (k+3)th frame.

In addition, when each frame is finished (after each pixel is charged), the charge-sharing control signal CSC from the timing controller 700 is applied to each gate of the PCS switches 311~31m through the first control line CL1. When the PCS switches 311~31m are turned on in response to the charge-sharing control signal CSC, the electric charges are shared between odd data lines DL1, DL3, . . . , DLm-1 and the even data lines DL2, DL4, . . . , DLm after each pixel is charged. The timing controller 700 controls a timing at which the charge-sharing control signal CSC is applied to the first control line CL1. Therefore, the timing controller 700 controls a timing at which the electric charges are shared between the data lines DL1~DLm. As illustrated with reference to FIG. 10, when each frame is finished, electric charges may be shared between the data lines DL1~DLm. In other example embodiments, electric charges may be shared between the data lines DL1~DLm whenever each frame starts. In other example embodiments, electric charges may be shared between the data lines DL1~DLm whenever the gate signal is applied (e.g., at every horizontal synchronization period).

Figure 11:
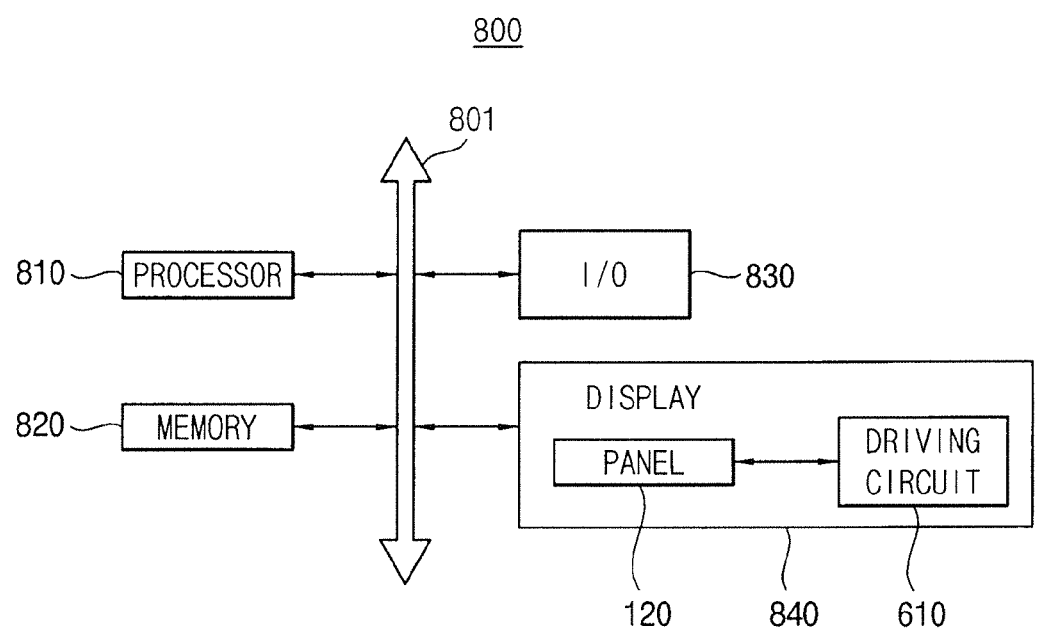
FIG. 11 is a block diagram illustrating an electric device having the display device of FIG. 10 according to some example embodiments.

FIG. 11 is a block diagram illustrating an electric device having the display device and operating according to the operation of FIG. 10, according to some example embodiments.

Referring to FIG. 11, an electric device 800 may include a processor 810, a memory device 820, an input/output (I/O) device 830, and a display device 840.

The processor 810 may perform specific calculations, or computing functions for various tasks. For example, the processor 810 may correspond to a microprocessor, a central processing unit (CPU), etc. The processor 810 may be coupled to the memory device 820 via a bus 801. For example, the memory device 820 may include at least one volatile memory device such as a dynamic random access memory (DRAM) device, a static random access memory (SRAM) device, etc. and/or at least one non-volatile memory device such as an erasable programmable read-only memory (EPROM) device, an electrically erasable programmable read-only memory (EEPROM) device, a flash memory device, etc. The memory device 820 may store software performed by the processor 810. The I/O device 830 may be coupled to the bus 801. The I/O device 830 may include at least one input device (e.g., a keyboard, keypad, a mouse, etc), and/or at least one output device (e.g., a printer, a speaker, etc). The processor 810 may control operations of the I/O device 830.

The display device 840 may be coupled to the processor 810 via the bus 801. As described above, the display device 840 may include the display panel 120 and the driving circuit 610. The display panel 120 may include the pixels that are coupled to the gate lines GL1~GLn and the data lines DL1~DLm. During each frame, the driving circuit 610 may sequentially apply the gate signal to the gate lines GL1~GLn, and may apply the data voltages to the data lines DL1~DLm. Although not illustrated in FIG. 11, the display device may include the first switching circuit 310 of the display device 600 of FIG. 9. The first switching circuit 310 may operate as the LTS switch in the inspection mode and may operate as the PCS switch in the image display mode. Accordingly, laser trimming procedure may be skipped, and the occupied circuit area may be reduced. The display device 840 has a same operation as the display device 600 of FIG. 9, and thus, detailed description of the display device 840 will be omitted.

The electric device 800 may correspond to a digital television, a cellular phone, a smart phone, a personal digital assistant (PDA), a portable multimedia player (PMP), a MP3 player, a laptop computer, a desktop computer, a digital camera, etc.

Figure 12:
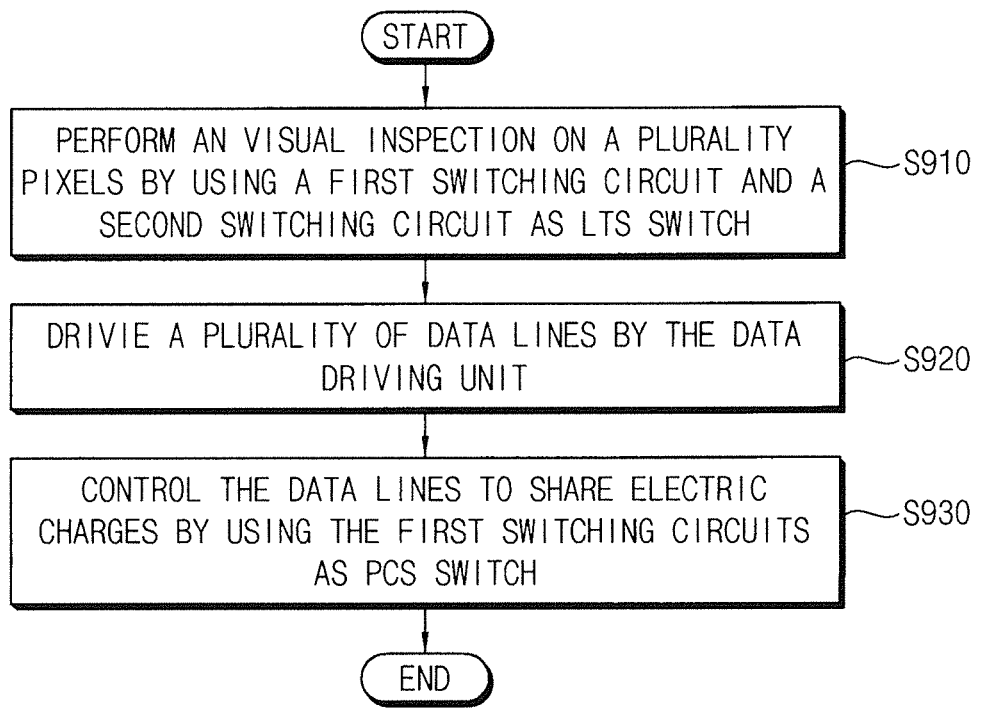
FIG. 12 is a flow chart illustrating a method of operating a display device.

FIG. 12 is a flow chart illustrating a method of operating a display device.

Hereinafter, there will be description about a method of operating a display device with reference to FIGS. 1 and 12.

In the method of operating the display device, a visual inspection is performed of the pixels 130 by using the first switching circuit 310 and the second switching circuit 420 as the LTS switches (S910). The PCS switches 311~31m of the first switching circuit 310 are turned off in response to the first switching control signal SCS1, and the LTS switches 421~42m of the second switching circuit 420 are turned on in response to the second switching control signal SCS2. The inspection signals IV1 and IV2 are delivered to the pixels 130 through the inspection lines IL1 and IL2, the pixels 130 are inspected in response to the inspection signals IV1 and IV2. The data lines DL1~DLm are driven by the data driving unit 200 (S920). The data lines DL1~DLm are controlled to share the electric charge by using the first switching circuit 310 as the PCS switch (S930). The LTS switches 421~42m of the second switching circuit 420 are turned off in response to the second switching control signal SCS2, and the PCS switches 311~31m of the first switching circuit 310 are turned on in response to the first switching control signal SCS1. The electric charges may be shared between the data lines DL1~DLm before or after the pixels 130 are charged. Detailed description of the method of operating the display device will be omitted, because the detailed description may be substantially similar to example embodiments with reference to FIGS. 1 through 11.

According to example embodiments, a laser trimming procedure may be skipped, and the occupied circuit may be reduced because the first switching circuit operates as the LTS switch in the inspection mode and operates as the PCS switch in the image display mode.

The example embodiments may be usefully employed in various fields which require thin display panels.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. An array substrate comprising:
a display area comprising a plurality of pixels coupled to a plurality of gate lines and a plurality of data lines;
a data driving unit, coupled to a fan-out unit and configured to drive the data lines;
a first switching circuit between the display area and the data driving unit and configured to skip a laser trimming process in an inspection mode, and configured to control the data lines to share electric charges in an image display mode; and
a second switching circuit coupled to the fan-out unit via a fuse unit and configured to deliver an inspection signal to each of the pixels through the data lines in the inspection mode, and configured to be disconnected from the fan-out unit in the image display mode,
the fan-out unit being between the first switching circuit and the second switching circuit,
the fan-out unit being between the first switching circuit and the data driving unit, and
the fan-out unit including a plurality of fan-out lines each having a first end connected to each of the data lines and a second end connected to each fuse of a plurality of fuses in the fuse unit in the inspection mode, and connected to data driving unit in the image display mode,
wherein the first switching circuit comprises a plurality of pre-charge sharing (PCS) switches comprising alternately arranged first switches and second switches, such that each first switch is adjacent one or more second switches, and such that each second switch is adjacent one or more first switches, each of the PCS switches having a control terminal coupled to a first control line,
wherein the first switches have a second terminal coupled to a first sharing line and a first terminal coupled to an odd data line of the data lines,
wherein the second switches have a second terminal coupled to a second sharing line and a first terminal coupled to an even data line of the data lines, and
wherein the first switches are configured to be operated independently from the second switches.

2. The array substrate of claim 1,
wherein the second switching circuit comprises a plurality of laser trimming skip (LTS) switches, each of the LTS switches having a first terminal coupled to at least one inspection line that is coupled to at least one of the first sharing line and the second sharing line, a second terminal coupled to a corresponding fuse of a plurality of fuses in the fuse unit, and a control terminal coupled to a second control line.

3. The array substrate of claim 2, wherein the first control line is configured to receive a first switching control signal for turning off the PCS switches in the inspection mode, and the second control line is configured to receive a second switching control signal for turning on the LTS switches in the inspection mode.

4. The array substrate of claim 3, wherein the inspection signal is applied to the at least one inspection line in the inspection mode to inspect whether a corresponding one of the pixels is electrically faulty.

5. The array substrate of claim 4, wherein each of the fuses is configured to be opened upon receiving a current above a level from the at least one inspection lines in the inspection mode.

6. The array substrate of claim 2, wherein the at least one inspection line comprises first and second inspection lines, and
wherein the LTS switches comprise a plurality of third switches and a plurality of fourth switches, each of the third switches having the first terminal coupled to the first inspection line and the second terminal coupled to a corresponding one of the fuses corresponding to the odd data line of the data lines, and each of the fourth switches having the first terminal coupled to the second inspection line and the second terminal coupled to a corresponding one of the fuses corresponding to the even data line of the data lines.

7. The array substrate of claim 6, wherein the inspection signal comprises first and second inspection signals having different polarities with respect to each other, and the first and second inspection signals are respectively applied to the first and second inspection lines in the inspection mode.

8. The array substrate of claim 2, wherein each of the PCS switches comprises a metal oxide semiconductor (MOS) transistor having a size for charging the shared electric charges, and
wherein each of the LTS switches comprises a MOS transistor having a size smaller than the size of the PCS switch.

9. The array substrate of claim 8, wherein each of the PCS switches comprises an n-type MOS transistor.

10. The array substrate of claim 8, wherein each of the LTS switches comprises a p-type MOS transistor.

11. The array substrate of claim 1, wherein the data driving unit is on an area which is substantially overlapped with the fuse unit and the second switching circuit.

12. The array substrate of claim 1, further comprising a gate driving unit configured to drive the gate lines.

* * * * *